United States Patent
Yano

(10) Patent No.: US 9,193,892 B2
(45) Date of Patent: Nov. 24, 2015

(54) AQUEOUS DISPERSION, AND LAMINATE, ADHESIVE FOR FOOTWEAR, AND FOOTWEAR MADE USING SAME

(75) Inventor: Takuma Yano, Kyoto (JP)

(73) Assignee: UNITIKA LTD., Hyogo (JP)

( * ) Notice: Subject to any disclaimer, the term of this patent is extended or adjusted under 35 U.S.C. 154(b) by 78 days.

(21) Appl. No.: 14/126,962

(22) PCT Filed: Jun. 14, 2012

(86) PCT No.: PCT/JP2012/065189
§ 371 (c)(1),
(2), (4) Date: Dec. 17, 2013

(87) PCT Pub. No.: WO2012/176677
PCT Pub. Date: Dec. 27, 2012

(65) Prior Publication Data
US 2014/0137435 A1     May 22, 2014

(30) Foreign Application Priority Data

Jun. 23, 2011  (JP) .................. 2011-139966
Dec. 2, 2011   (JP) .................. 2011-264340

(51) Int. Cl.
| | | |
|---|---|---|
| C08L 27/00 | (2006.01) | |
| C08J 3/22 | (2006.01) | |
| C09J 147/00 | (2006.01) | |
| A43B 1/10 | (2006.01) | |
| A43B 9/12 | (2006.01) | |
| A43B 13/04 | (2006.01) | |
| C09J 123/26 | (2006.01) | |
| C08L 11/00 | (2006.01) | |
| C09J 193/04 | (2006.01) | |
| C08J 5/12 | (2006.01) | |
| C09J 123/08 | (2006.01) | |
| A43D 25/00 | (2006.01) | |
| C09J 123/04 | (2006.01) | |

(52) U.S. Cl.
CPC .................. *C09J 147/00* (2013.01); *A43B 1/10* (2013.01); *A43B 9/12* (2013.01); *A43B 13/04* (2013.01); *A43D 25/00* (2013.01); *C08J 5/127* (2013.01); *C08L 11/00* (2013.01); *C09J 123/04* (2013.01); *C09J 123/0846* (2013.01); *C09J 123/26* (2013.01); *C09J 193/04* (2013.01); *C08J 2321/00* (2013.01); *C08J 2323/00* (2013.01); *C08J 2421/00* (2013.01); *C08J 2451/06* (2013.01); *C08L 2201/54* (2013.01); *Y10T 428/3183* (2015.04)

(58) Field of Classification Search
CPC .............................. C08J 147/00; C08J 123/26
USPC ........................................................ 524/519
See application file for complete search history.

(56) References Cited

FOREIGN PATENT DOCUMENTS

| | | |
|---|---|---|
| EP | 0626398 | 11/1996 |
| JP | 6-336579 | 12/1994 |
| JP | 10-212465 | 8/1998 |
| JP | 2011-52062 | 3/2001 |
| JP | 2001-342446 | 12/2001 |
| JP | 2002-51808 | 2/2002 |
| JP | 2003-277715 | 10/2003 |
| JP | 2004-189964 | 7/2004 |
| JP | 2007-217564 | 8/2007 |
| JP | 2009-235289 | 10/2009 |
| JP | 2009235289 A * | 10/2009 |
| JP | 2011-12196 | 1/2011 |

OTHER PUBLICATIONS

Translation of JP 2009-235289, Oct. 15, 2009.*
Machine translation for JP 10-212465.
Machine translation for JP 2004-189964.
Machine translation for JP 2002-51808.
Machine translation for JP 2003-277715.
Machine translation for JP 2001-342446.
Machine translation for JP 2009-235289.
Machine translation for JP 2011-52062.
Machine translation for JP 2011-12196.
Machine translation for JP 2007-217564.

* cited by examiner

*Primary Examiner* — Hui Chin
(74) *Attorney, Agent, or Firm* — Fildes & Outland, P.C.

(57) ABSTRACT

An aqueous dispersion including an acid-modified polyolefin resin (A) having a content of an unsaturated carboxylic acid component of 0.1 to 10% by mass, a rubber component (B), a tackifier component (C) and an aqueous medium, wherein in relation to 100 parts by mass of the acid-modified polyolefin resin (A), the content of the rubber component (B) is 5 to 1900 parts by mass, and in relation to 100 parts by mass of the total amount of the acid-modified polyolefin resin (A) and the rubber component (B), the content of the tackifier component (C) is 5 to 300 parts by mass.

19 Claims, No Drawings

AQUEOUS DISPERSION, AND LAMINATE, ADHESIVE FOR FOOTWEAR, AND FOOTWEAR MADE USING SAME

TECHNICAL FIELD

The present invention relates to an aqueous dispersion including an acid-modified polyolefin resin, a rubber component and a tackifier component, and a laminate, an adhesive for footwear and footwear made by using the aqueous dispersion.

BACKGROUND ART

Rubber products such as conveyor belts, hoses and rubber linings are frequently used in a harsh environment subject to strong vibration or stress. Polyolefin resins such as polyethylene resins and polypropylene resins have high rigidity and high weatherability as compared to rubber, and hence if the production of composite materials from polyolefin resins and rubbers is made possible, high performance of rubber products can be expected.

However, both polyolefin resins and rubbers are poor in adhesiveness, and hence it is difficult to allow polyolefin resins and rubbers to adhere to each other by using adhesives or adhesive tapes; thus, powerful techniques for producing composite materials durable to use in a harsh environment subject to strong vibration or stress are regarded as necessary.

Similarly to the production of composite materials from polyolefin resins and rubbers, also in the adhesives for footwear used in production and repair of footwear, excellent adhesiveness to materials such as polyolefin resins and rubbers is required. Excellent adhesiveness to resins other than polyolefin resins, leather materials and materials constituting woven fabrics/knitted fabrics is also required.

For example, Patent Literature 1 and Patent Literature 2 have proposed adhesive compositions obtained by combining chloroprene rubbers and tackifying agents, as adhesives excellent in adhesiveness to rubber.

However, these adhesives are insufficient in adhesiveness; in particular, these adhesives are poor in the adhesiveness to polyolefin resin, and cannot allow polyolefin resin and rubber to sufficiently adhere to each other.

The adhesive proposed in Patent Literature 1 is a solvent-based adhesive, and is not desirable from the viewpoint of the health of the users and the environmental conservation. On the other hand, the adhesive proposed in Patent Literature 2 is an aqueous adhesive; however, this aqueous adhesive sometimes causes cissing at the time of application thereof depending on the type of the substrate, and sometimes causes aggregation of the polychloroprene latex when a small amount of an organic solvent such as an alcohol is added in order to improve the wettability.

As for the adhesive composition prepared by combining a chloroprene rubber and a tackifying agent, the coating film (adhesive layer) obtained by applying and drying this composition has stickiness or tackiness on the surface thereof even at room temperature. Accordingly, for example, when the adhesive is applied to a sheet-like adherend and dried, and then the adherend is intended to be wound up to a roll to be stored at room temperature, the adherend sometimes cannot be wound up or wound off, and sometimes has dust adhering thereto to degrade the adhesive strength at the time of adhesion. As the method for suppressing the stickiness or the tackiness of the surface of the coating film, a method has been known in which a wax or an inorganic particle is added to the adhesive composition to impart slippage to the surface of the coating film. However, adoption of such a method sacrifices the adhesiveness, and hence it has been difficult to ensure the compatibility between the adhesiveness and the slippage.

A laminate prepared by adhesion with an adhesive composition prepared by combining a chloroprene rubber and a tackifying agent tends to be degraded in the adhesive strength thereof when repeatedly bent in a subfreezing environment.

Patent Literature 3 proposes an aqueous primer made adaptable to polyolefin resin by combining a chloroprene rubber and a tackifying agent with an ethylene-vinyl acetate resin, but does not present the performance of the aqueous primer as an adhesive.

Most of the adhesives for footwear are solvent-based adhesives, and involves issues from the viewpoint of, for example, the environmental conservation as described above; accordingly, for example, Patent Literature 4 and Patent Literature 5 have proposed aqueous adhesives for footwear.

However, the adhesive described in Patent Literature 4 requires a preliminary treatment of the surface of the adherend with a plasma treatment or a solvent-based primer, and hence disadvantageously complicates the involved production step to increase the cost. Moreover, as a result of the use of a solvent-based primer, the issues such as environmental conservation cannot yet be solved.

The adhesive described in Patent Literature 5 limits adherable materials to specific materials; for example, the adhesiveness to polyolefin resin has not yet been investigated.

As described above, no adhesive capable of allowing a polyolefin resin and a rubber to sufficiently adhere to each other has yet been obtained.

The aqueous composition prepared by combining a chloroprene rubber and a tackifying agent undergoes aggregation due to the addition of an organic solvent such as an alcohol, and hence does not allow the wettability thereof.

The adhesive composition prepared by combining a chloroprene rubber and a tackifying agent disadvantageously results in too strong stickiness and tackiness of the surface of the coating film at around room temperature. A laminate obtained by adhesion with this adhesive composition tends to be degraded in the adhesive strength when repeatedly bent in a subfreezing environment, and hence is disadvantageous in cold regions in winter.

Among aqueous adhesives for footwear, no adhesives have yet been found which ensure the compatibility between the sufficient adhesiveness and the cost and environmental conservation.

CITATION LIST

Patent Literature

Patent Literature 1: Japanese Patent Laid-Open No. 10-212465
Patent Literature 2: Japanese Patent Laid-Open No. 6-336579
Patent Literature 3: Japanese Patent Laid-Open No. 2004-189964
Patent Literature 4: Japanese Patent Laid-Open No. 2002-51808
Patent Literature 5: Japanese Patent Laid-Open No. 2003-277715

SUMMARY OF INVENTION

Technical Problem

The technical problem of the present invention is to solve the foregoing problems and to provide an aqueous dispersion capable of allowing polyolefin resin and rubber to sufficiently adhere to each other, capable of improving the wettability by the addition of an organic solvent such as an alcohol without undergoing aggregation, capable of having excellent adhesiveness without beforehand treating the surface of an adherend with plasma treatment or a solvent-based primer, capable of obtaining a coating film low in stickiness or tackiness on the surface of the coating film at around room temperature, capable of obtaining a laminate without degrading in adhesive strength when the laminate is repeatedly bent in a subfreezing environment, and also utilizable as an adhesive for footwear.

Solution to Problem

The present inventors made a diligent study in order to solve the foregoing technical problem, and consequently have reached the present invention by discovering that an aqueous dispersion including a specific acid-modified polyolefin resin, a specific rubber component and a specific tackifier component solves the foregoing technical problem.

Specifically, the gist of the present invention is as follows.

(1) An aqueous dispersion including an acid-modified polyolefin resin (A) having a content of an unsaturated carboxylic acid component of 0.1 to 10% by mass, a rubber component (B), a tackifier component (C) and an aqueous medium, wherein in relation to 100 parts by mass of the acid-modified polyolefin resin (A), the content of the rubber component (B) is 5 to 1900 parts by mass, and in relation to 100 parts by mass of the total amount of the acid-modified polyolefin resin (A) and the rubber component (B), the content of the tackifier component (C) is 5 to 300 parts by mass.

(2) The aqueous dispersion according to (1), wherein the acid-modified polyolefin resin (A) is an ethylene-(meth)acrylic acid ester-(anhydrous) maleic acid copolymer.

(3) The aqueous dispersion according to (1) or (2), wherein a melt flow rate value (according to ISO1133, at 190° C., under a load of 21.2 N) of the acid-modified polyolefin resin (A) is 1 to 300 g/10 min.

(4) The aqueous dispersion according to (1) or (2), wherein the rubber component (B) is a chloroprene rubber.

(5) The aqueous dispersion according to (1) or (2), wherein the tackifier component (C) is a terpene-based resin.

(6) The aqueous dispersion according to (1) or (2), wherein the number average particle size of the dispersed particles in the aqueous dispersion is 0.5 μm or less.

(7) The aqueous dispersion according to (1) or (2), wherein the static friction coefficient (according to ISO8295) of the surface of an obtained coating film in an atmosphere at 23±2° C. is 1.5 or less.

(8) A laminate including a coating film obtained from the aqueous dispersion according to (1) or (2), wherein the coating film is laminated at least on a part of a substrate.

(9) The laminate according to (8), wherein the static friction coefficient (according to ISO8295) of the surface of the coating film in an atmosphere at 23±2° C. is 1.5 or less.

(10) A laminate wherein a substrate including a polyolefin resin and a substrate including a rubber are allowed to adhere to each other through the intermediary of a coating film obtained from the aqueous dispersion according to (1) or (2).

(11) An adhesive for footwear, wherein the adhesive for footwear is an adhesive including the aqueous dispersion according to (1) or (2), and a constitutional member of footwear is the adherend of the adhesive.

(12) The adhesive for footwear according to (11), wherein the constitutional member of footwear includes one or more selected from the group consisting of a leather material, a woven fabric, a knitted fabric, a polyvinyl chloride resin, a polyurethane resin, a polyolefin resin and a rubber.

(13) A set of footwear obtained by using the adhesive for footwear according to (11).

Advantageous Effects of Invention

The aqueous dispersion of the present invention is excellent in the adhesiveness to polyolefin resin or rubber, and allows polyolefin resin and rubber to satisfactorily adhere to each other. The aqueous dispersion of the present invention has excellent adhesiveness to various materials other than polyolefin resin and rubber, such as leather, metal, glass, plastic, paper, synthetic paper and wood.

The aqueous dispersion of the present invention also suppresses aggregation due to the addition of an organic solvent such as an alcohol, and hence can achieve the improvement of the wettability by the addition of an organic solvent.

The aqueous dispersion of the present invention has excellent adhesiveness without beforehand treating the surface of an adherend with plasma treatment or a solvent-based primer.

The dispersion of the present invention is aqueous, and hence exerts a small load on the health of an operator and on the environment.

Moreover, the coating film obtained from the aqueous dispersion of the present invention is low in stickiness or tackiness on the surface thereof, excellent in the slippage of the surface thereof, and capable of being wound up on a roll and being stored at room temperature.

Additionally, the laminate obtained by using as an adhesive the aqueous dispersion of the present invention can be used even in a subfreezing environment.

The aqueous dispersion of the present invention can be utilized as an adhesive for footwear.

DESCRIPTION OF EMBODIMENTS

Hereinafter, the present invention is described in detail.

The aqueous dispersion of the present invention includes an acid-modified polyolefin resin (A), a rubber component (B), a tackifier component (C) and an aqueous medium.

The acid-modified polyolefin resin (A) includes an olefin component as the main components thereof; as the olefin component, an alkene having 2 to 6 carbon atoms such as ethylene, propylene, isobutylene, 2-butene, 1-butene, 1-pentene and 1-hexene are preferable, and a mixture of these may also be used. Among these, from the viewpoint of improvement of the adhesiveness, alkenes having 2 to 4 carbon atoms such as ethylene, propylene, isobutylene and 1-butene are more preferable, ethylene and propylene are particularly preferable, and ethylene is furthermore preferable.

The content of the olefin component is preferably 45 to 99.9% by mass, more preferably 55 to 99.8% by mass, furthermore preferably 60 to 99.7% by mass, particularly preferably 70 to 99.5% by mass and most preferably 80 to 99.0% by mass of the acid-modified polyolefin resin (A). When the content of the olefin component deviates from the range from 45 to 99.9% by mass, the adhesiveness is sometimes degraded.

The acid-modified polyolefin resin (A) is required to include an unsaturated carboxylic acid component from the viewpoint of improvement of the adhesiveness and, at the same time, improvement of the dispersibility in an aqueous dispersion.

Examples of the unsaturated carboxylic acid component include acrylic acid, methacrylic acid, (anhydrous) maleic acid, (anhydrous) itaconic acid, fumaric acid and crotonic acid, and additionally, half esters and half amides of unsaturated dicarboxylic acids. Among these, acrylic acid, methacrylic acid and (anhydrous) maleic acid are preferable, and in particular, (anhydrous) maleic acid is preferable. It is to be noted that, for example, "(anhydrous) such and such acid" as referred to herein means "such and such acid or anhydrous such and such acid." Specifically, (anhydrous) maleic acid means maleic acid or anhydrous maleic acid.

The unsaturated carboxylic acid component is only required to be copolymerized with the olefin component and is not limited in the form thereof; examples of the copolymerization state include random copolymerization, block copolymerization and graft copolymerization (graft-modification).

The content of the unsaturated carboxylic acid component is required to be 0.1 to 10% by mass, and is preferably 0.2 to 8% by mass, more preferably 0.5 to 5% by mass, furthermore preferably 1 to 5% by mass and particularly preferably 2 to 4% by mass of the acid-modified polyolefin resin (A). When the content of the unsaturated carboxylic acid component is less than 0.1% by mass, the adhesiveness is degraded or the preparation of the aqueous dispersion is difficult; on the other hand, when the content exceeds 10% by mass, the adhesiveness or the water-resistant adhesiveness (the adhesiveness when the adhesive layer is brought into contact with moisture) tends to be degraded.

The acid-modified polyolefin resin (A) can sometimes impart more excellent adhesiveness through further copolymerization of the components other than the foregoing olefin component and unsaturated carboxylic acid.

Specific examples of such other components include: (meth)acrylic acid esters such as methyl (meth)acrylate, ethyl (meth)acrylate and butyl (meth)acrylate; maleic acid diesters such as dimethyl maleate, diethyl maleate and dibutyl maleate; alkyl vinyl ethers such as methyl vinyl ether and ethyl vinyl ether; vinyl esters such as vinyl formate, vinyl acetate, vinyl propionate, vinyl pivalate and vinyl versatate, and vinyl alcohols obtained by saponification of vinyl esters with basic compounds; (meth)acrylic acid amides; and mixtures of these. Among these, (meth)acrylic acid esters such as methyl (meth)acrylate, ethyl (meth)acrylate and butyl (meth)acrylate, and vinyl ester components such as vinyl formate, vinyl acetate, vinyl propionate, vinyl pivalate and vinyl versatate are preferable; (meth)acrylic acid esters such as methyl (meth)acrylate, ethyl (meth)acrylate and butyl (meth)acrylate are more preferable. It is to be noted that "such and such (meth)acrylate" means "such and such acrylate or such and such methacrylate."

These other components are only required to be copolymerized in the acid-modified polyolefin resin (A), but the mode of the copolymerization is not limited, and examples of the copolymerization state include random copolymerization, block copolymerization and graft copolymerization (graft-modification).

The content of these other components is preferably 1 to 45% by mass, more preferably 2 to 35% by mass, furthermore preferably 3 to 25% by mass and particularly preferably 4 to 18% by mass of the acid-modified polyolefin resin (A). When the content of the other components is less than 1% by mass, the adhesiveness improvement effect is small, and the content of the other components exceeds 45% by mass, the water-resistant adhesiveness or the heat-resistant adhesiveness (hot adhesiveness in a heated atmosphere) tends to be degraded.

In the present invention, specific examples of the acid-modified polyolefin resin (A) include: ethylene-(meth)acrylic acid ester-(anhydrous) maleic acid copolymer, ethylene-propylene-(meth)acrylic acid ester-(anhydrous) maleic acid copolymer, ethylene-butene-(meth)acrylic acid ester-(anhydrous) maleic acid copolymer, propylene-butene-(meth)acrylic acid ester-(anhydrous) maleic acid copolymer, ethylene-propylene-butene-(meth)acrylic acid ester-(anhydrous) maleic acid copolymer, ethylene-(meth)acrylic acid copolymer, ethylene-(anhydrous)maleic acid copolymer, ethylene-propylene-(anhydrous) maleic acid copolymer, ethylene-butene-(anhydrous) maleic acid copolymer, propylene-butene-(anhydrous) maleic acid copolymer, ethylene-propylene-butene-(anhydrous) maleic acid copolymer, ethylene-vinyl acetate-(anhydrous) maleic acid copolymer and ethylene-vinyl acetate-acryl-(anhydrous) maleic acid copolymer; among these, ethylene-(meth)acrylic acid ester-(anhydrous) maleic acid copolymer is preferable from the viewpoint of adhesiveness.

In the present invention, the melting point of the acid-modified polyolefin resin (A) is preferably 50° C. or higher, more preferably 60 to 250° C. and particularly preferably 80 to 200° C. When the melting point of the acid-modified polyolefin resin (A) is lower than 50° C., the heat-resistant adhesiveness tends to be degraded.

The weight average molecular weight of the acid-modified polyolefin resin (A) is preferably 20000 to 100000, more preferably 25000 to 70000, furthermore preferably 30000 to 50000 and particularly preferably 35000 to 50000. When the weight average molecular weight of the acid-modified polyolefin resin (A) is less than 20000, the adhesiveness tends to be degraded. On the other hand, when the weight average molecular weight exceeds 100000, it tends to be difficult to obtain the aqueous dispersion.

However, in general, the polyolefin resin is sparingly soluble in a solvent, and consequently, the measurement of the molecular weight is sometimes difficult. In such a case, it is recommended to adopt, as a measure for the molecular weight, the melt flow rate value representing the fluidity of the molten resin.

The melt flow rate value (according to ISO1133, at 190° C., under a load of 21.2 N) of the acid-modified polyolefin resin (A) is preferably 1 to 300 g/10 min, more preferably 2 to 200 g/10 min, furthermore preferably 3 to 100 g/10 min and particularly preferably 3 to 80 g/10 min. When the melt flow rate value exceeds 300 g/10 min, the adhesiveness tends to be degraded. On the other hand, when the melt flow rate value is less than 1 g/10 min, it tends to be difficult to obtain the aqueous dispersion.

In the present invention, it is not particularly necessary to chlorinate the acid-modified polyolefin resin (A) for the purpose of improving the adhesiveness and the water dispersibility, and preferably the acid-modified polyolefin resin does not include a chlorinated polyolefin resin from the viewpoint of environmental conservation and the simplification of the production step. However, when the acid-modified polyolefin resin (A) is required to be chlorinated depending on the intended purpose of use, the acid-modified polyolefin resin (A) may be chlorinated. In a chlorination method, the acid-modified polyolefin resin (A) is dissolved in a chlorine-based solvent, and then chlorination can be performed by blowing gaseous chlorine into the resulting solution.

The aqueous dispersion of the present invention include the acid-modified polyolefin resin (A), the rubber component (B), the tackifier component (C) and an aqueous medium; for example, the aqueous dispersion of the present invention can be produced by mixing an aqueous dispersion (I) of the acid-modified polyolefin resin (A), an aqueous dispersion (II) of the rubber component (B) and an aqueous dispersion (III) of the tackifier component (C).

As the method for dispersing the acid-modified polyolefin resin (A) in an aqueous medium in order to obtain the aqueous dispersion (I) of the acid-modified polyolefin resin (A), heretofore known dispersion methods such as a self-emulsification method and a forced emulsification method may be adopted. For the production of the aqueous dispersion (I) of the acid-modified polyolefin resin (A), it is preferable to adopt a dispersion method which does not use an emulsifier or a dispersant optionally added for the purpose of promoting the dispersion such as a surfactant or a high-acid-value wax, from the viewpoint of enhancing the adhesiveness or the water-resistant adhesiveness.

From the viewpoint of adhesiveness, the aqueous dispersion of the present invention is preferably an anionic aqueous dispersion obtained by neutralizing with a basic compound the unsaturated carboxylic acid component of the acid-modified polyolefin resin (A) in an aqueous medium. It is to be noted that the anionic aqueous dispersion of the acid-modified polyolefin resin (A) usually exhibits alkalinity.

The aqueous medium used when the acid-modified polyolefin resin (A) is dispersed to prepare an aqueous dispersion is water or a medium composed of a liquid that contains water, and the aqueous medium may include a neutralizing agent or a water-soluble organic solvent contributing to dispersion stabilization. Examples of the water-soluble organic solvent include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone, cyclohexanone and isophorone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; and glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ether acetate; and moreover, 3-methoxy-3-methyl butanol, 3-methoxybutanol, acetonitrile, dimethyl formamide, dimethyl acetamide, diacetone alcohol and ethyl acetoacetate. These organic solvents may also be used as mixtures of two or more thereof.

Examples of the basic compound used to neutralize the unsaturated carboxylic acid component of the acid-modified polyolefin resin (A) include: ammonia; organic amine compounds such as triethylamine, N,N-dimethyl ethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, 3-methoxypropylamine, monoethanolamine, morpholine, N-methylmorpholine and N-ethylmorpholine; and alkali metal hydroxides such as sodium hydroxide and potassium hydroxide. These basic compounds may also be used as mixtures of two or more thereof.

The number average particle size of the acid-modified polyolefin resin (A) included in the aqueous dispersion (I) of the acid-modified polyolefin resin (A) is preferably 0.5 µm or less and more preferably 0.05 to 0.2 µm. When the number average particle size of the acid-modified polyolefin resin (A) exceeds 0.5 µm, the storage stability of the obtained aqueous dispersion of the present invention tends to be degraded.

Next, the rubber component (B) is described.

The aqueous dispersion of the present invention is required to include the rubber component (B).

In the aqueous dispersion of the present invention, the content of the rubber component (B) in relation to 100 parts by mass of the acid-modified polyolefin resin (A) is required to be 5 to 1900 parts by mass, and is more preferably 10 to 900 parts by mass and particularly preferably 25 to 400 parts by mass. When the content of the rubber component (B) is less than 5 parts by mass, the adhesiveness to a rubber-containing substrate is degraded, and when the content of the rubber component (B) exceeds 1900 parts by mass, the adhesiveness to a polyolefin resin-containing substrate is degraded.

As the rubber component (B), various heretofore known rubber components can be used. Examples of such rubber components include: chloroprene rubber, isoprene rubber, urethane rubber, natural rubber, styrene butadiene rubber, styrene butadiene ethylhexyl acrylate rubber, butyl rubber, nitrile rubber and ethylene propylene rubber; these can be used each alone or as mixtures of two or more thereof. Among these, chloroprene rubber is preferable because of being highly effective in improving the adhesiveness.

Chloroprene rubber is the homopolymer of 2-chloro-1,3-butadiene (hereinafter, referred to as chloroprene) or polychloroprene which is a copolymer between chloroprene and a monomer copolymerizable with chloroprene. As the chloroprene rubber, heretofore known products can be used; however, it is preferable to use a polychloroprene latex (an aqueous dispersion in which polychloroprene is dispersed in an aqueous medium) obtained by emulsion polymerization, in the presence of an emulsifier or a dispersant, of chloroprene alone, or chloroprene and a monomer copolymerizable with chloroprene.

Examples of the monomer copolymerizable with chloroprene include: 2,3-dichloro-1,3-butadiene, 1-chloro-1,3-butadiene, butadiene, isoprene, styrene, acrylonitrile, hydroxyethyl methacrylate, hydroxypropyl methacrylate, polyethylene glycol monoacrylate, polyethylene glycol monomethacrylate, glycerin monomethacrylate, acrylic acid and the esters thereof, methacrylic acid and the esters thereof, maleic acid and fumaric acid; these may also be used in combinations of two or more thereof. Among these, it is preferable to copolymerize an unsaturated carboxylic acid component such as acrylic acid, methacrylic acid, maleic acid and fumaric acid because an effect to improve the adhesiveness is provided; it is more preferable to copolymerize methacrylic acid from the viewpoint of copolymerizability.

The content of the monomer copolymerizable with chloroprene is not particularly limited, but is preferably 40% by mass or less of the polychloroprene from the viewpoint of the retention of the properties of the polychloroprene. When an unsaturated carboxylic acid is allowed to copolymerize with chloroprene, the content of the unsaturated carboxylic acid is preferably 10% by mass or less, more preferably 0.2 to 5% by mass, furthermore preferably 0.5 to 4% by mass and particularly preferably 0.7 to 3.5% by mass of the polychloroprene. When the content of the unsaturated carboxylic acid is too small, the improvement effect of adhesiveness is sometimes insufficient, and when the content of the unsaturated carboxylic acid exceeds 10% by mass, the emulsified state sometimes is unstable. The copolymer as referred to herein includes graft copolymers in which other monomers are graft polymerized in the presence of polychloroprene.

As the emulsifier or the dispersant used in the emulsion polymerization, heretofore known various anionic type, nonionic type and cationic type emulsifiers or dispersants can be used.

Examples of the anionic type emulsifier include: carboxylic acid type, sulfonic acid type and sulfuric acid ester type emulsifiers; specifically, alkali metal salts of rosin acid, and alkyl sulfonates having 8 to 20 carbon atoms, alkyl aryl sulfates having 8 to 20 carbon atoms and condensates between sodium naphthalene sulfonate and formaldehyde.

Specific examples of the nonionic type include polyvinyl alcohol and the copolymers thereof (for example, copolymer with acrylamide), polyvinyl ether and the copolymers thereof (for example, copolymer with maleic acid), polyvinylpyrrolidone and the copolymers thereof (for example, copolymer with vinyl acetate), chemically modified products of these (co)polymers, and cellulose-based derivatives (hydroxy ethyl cellulose).

Specific examples of the cationic type include aliphatic amine salts and aliphatic quaternary ammonium salts, namely, octadecyltrimethyl ammonium chloride, dodecyltrimethyl ammonium chloride and dilauryldimethyl ammonium chloride.

Among these, it is preferable to use the anionic type emulsifiers. The emulsifiers other than the anionic type tend to be poor in adhesiveness and tend to be degraded in the mixing stability with the acid-modified polyolefin resin (A) or the tackifier component (C). The addition amount of the emulsifier or the dispersant is preferably 0.5 to 20% by mass of the total mass of the initially fed monomers. When the addition amount of the emulsifier or the dispersant is less than 0.5% by mass, the emulsifying capacity tends to be insufficient, and when the addition amount exceeds 20% by mass, the adhesiveness or the water-resistant adhesiveness tends to be degraded.

The molecular weight, molecular weight distribution, gel content, molecular terminal structure, crystallization rate and others of the rubber component (B) may be regulated according to the properties of the intended adhesive; these physical properties and other properties can be regulated by controlling, when the monomers are polymerized, the polymerization temperature when the monomers are polymerized, the polymerization initiator, chain transfer agent and polymerization terminator added at the time of polymerization, the final rate of polymerization and others.

When the aqueous dispersion of the present invention is produced by mixing the aqueous dispersion (I) of the acid-modified polyolefin resin (A), the aqueous dispersion (II) of the rubber component (B) and the aqueous dispersion (III) of the tackifier component (C), the latex obtained by emulsion polymerization of the rubber component (B) can be used as the aqueous dispersion (II) of the rubber component (B). The number average particle size of the rubber component (B) in the latex is preferably 0.5 µm or less and more preferably 0.05 to 0.2 µm. When the number average particle size of the rubber component (B) exceeds 0.5 µm, the storage stability of the obtained aqueous dispersion of the present invention tends to be degraded.

The latex of the rubber component (B) is preferably alkaline from the viewpoint of the mixing stability with the acid-modified polyolefin resin (A) and the tackifier component (C). When the latex is acidic, it is preferable to use the latex after the latex is regulated so as to be alkaline with a basic compound such as ammonia or an amine.

Next, the tackifier component (C) is described.

The aqueous dispersion of the present invention is required to include the tackifier component (C).

In the aqueous dispersion of the present invention, the content of the tackifier component (C) in relation to 100 parts by mass of the total amount of the acid-modified polyolefin resin (A) and the rubber component (B) is required to be 5 to 300 parts by mass, and is more preferably 10 to 150 parts by mass, furthermore preferably 25 to 100 parts by mass and particularly preferably 40 to 100 parts by mass. When the content of the tackifier component (C) deviates from the range from 5 to 300 parts by mass, the adhesiveness is degraded.

As the tackifier component (C), various heretofore known tackifier components can be used; in the present invention, it is preferable to use the aqueous dispersion (III) of the tackifier component (C) in which the tackifier component (C) is dispersed in an aqueous medium.

Examples of the tackifier component (C) include rosins, rosin derivatives, petroleum-based resins, terpene-based resins, coumarone resins and indene resins; these can be used each alone or as mixtures of two or more thereof.

Examples of the rosins and the rosin derivatives include polymerized rosin, disproportionated rosin, hydrogenated rosin, maleated rosin, fumarated rosin, and the glycerin esters, pentaerythritol esters, methyl esters, ethyl esters, butyl esters, ethylene glycol esters, diethylene glycol esters and triethylene glycol esters of these.

Examples of the petroleum-based resin include: petroleum resins obtained by polymerizing the petroleum fraction having 5 carbon atoms; petroleum resins obtained by polymerizing the petroleum fraction having 9 carbon atoms; the petroleum resins obtained by hydrogenation of these petroleum resins; and the petroleum resins obtained by subjecting these petroleum resins to maleic acid-modification and phthalic acid-modification.

Examples of the terpene-based resin include low polymerization terpene-based resin, α-pinene polymer, β-pinene polymer, terpene phenol-based resin, aromatic-modified terpene-based resin and hydrogenated terpene-based resin.

Among these, the terpene-based resin is preferable from the viewpoint of adhesiveness, and the terpene phenol-based resin is more preferable.

From the viewpoint of the adhesiveness and the heat-resistant adhesiveness of the ring-and-ball softening point of the tackifier component (C) is preferably 80 to 180° C., more preferably 100 to 170° C. and particularly preferably 120 to 160° C. The ring-and-ball softening point is measured on the basis of the method described in JIS K5903.

As the aqueous medium constituting the aqueous dispersion (III) of the tackifier component (C), water or a medium composed of a liquid that contains water is used, and the aqueous medium may include a neutralizing agent, an emulsifier and a water-soluble organic solvent contributing to the dispersion stabilization.

The number average particle size of the tackifier component (C) included in the aqueous dispersion (III) of the tackifier component (C) is preferably 0.5 µm or less and more preferably 0.05 to 0.3 µm. When the number average particle size of the tackifier component (C) exceeds 0.5 µm, the storage stability of the obtained aqueous dispersion of the present invention tends to be degraded.

Additionally, the aqueous dispersion (III) of the tackifier component (C) is preferably alkaline.

The method for producing the aqueous dispersion of the present invention is not particularly limited; however, a method is preferable in which the aqueous dispersion (I) of the acid-modified polyolefin resin (A), the aqueous dispersion (II) (inclusive of latex) of the rubber component (B) and the aqueous dispersion (III) of the tackifier component (C) as described above are separately acquired, and then these aqueous dispersions are mixed in such a way that these aqueous dispersions meet the foregoing proportions. When the aqueous dispersions are mixed with each other, it is preferable that the mixing is performed under the condition of being stirred, for the purpose of maintaining the dispersion stability.

In the above-described way, it is possible to obtain the aqueous dispersion of the present invention, including the acid-modified polyolefin resin (A), the rubber component (B), the tackifier component (C) and the aqueous medium. Herein, the aqueous medium is water or a medium composed of a liquid that contains water, and also includes the aqueous media constituting the aqueous dispersion (I) of the acid-modified polyolefin resin (A), the aqueous dispersion (II) of the rubber component (B) and the aqueous dispersion (III) (inclusive of latex) of the tackifier component (C), and the aqueous media may include a neutralizing agent, an emulsifier and a water-soluble organic solvent contributing to the dispersion stabilization.

The number average particle size of the dispersed particles containing the acid-modified polyolefin resin (A), the rubber component (B) and the tackifier component (C) in the aqueous dispersion of the present invention is preferably 0.5 μm or less, more preferably 0.05 to 0.3 μm and particularly preferably 0.06 to 0.2 μm, from the viewpoint of maintaining the dispersion stability and the uniformity of the composition at the time of application.

The solid content concentration of the non-volatile component including the acid-modified polyolefin resin (A), the rubber component (B) and the tackifier component (C) in the aqueous dispersion of the present invention is preferably 5 to 70% by mass, more preferably 20 to 60% by mass and particularly preferably 30 to 50% by mass of the aqueous dispersion.

The viscosity of the aqueous dispersion of the present invention as measured under the condition of 20° C. with a B-type viscometer is preferably 500 to 100000 mPa·s, more preferably 1000 to 50000 mPa·s and particularly preferably 3000 to 30000 mPa·s.

To the aqueous dispersion of the present invention, various additives can be added within ranges not impairing the advantageous effects of the present invention. Examples of such additives include: resins (hereinafter, referred to as "other resins") other than the acid-modified polyolefin resin (A) and the rubber component (B) and the tackifier component (C); a cross-linking agent, a vulcanizing agent and inorganic fine particles.

Specific examples of the other resins include: polyvinyl acetate, polyvinyl alcohol, polyvinyl chloride, acrylic resin, acrylic silicon resin, ethylene-vinyl acetate copolymer, vinyl acetate-acrylic copolymer, ethylene-aminoacrylamide copolymer, ethylene-aminoacrylate copolymer, polyvinylidene chloride, styrene-maleic acid resin, styrene-aminoalkyl maleimide copolymer, styrene-butadiene resin, styrene-based elastomer, butadiene resin, acrylonitrile-butadiene resin, poly(meth)acrylonitrile resin, (meth) acrylamide resin, chlorinated polyethylene resin, chlorinated polypropylene resin, polyester resin, modified nylon resin, polyurethane resin, phenolic resin, silicone resin, epoxy resin, fluorine-containing resin, polyethylene imine and UV curable resin. These can be used each alone or as mixtures of two or more thereof. Among these, acrylic resin and polyurethane resin are preferable from the viewpoint of more improving the adhesiveness. When these resins are added, it is preferable to use aqueous dispersions or aqueous solutions prepared with these resins.

Examples of the suitable acrylic resins used as the other resins include: an acrylic resin emulsion obtained by emulsion polymerization, in an aqueous medium, of 100 parts by mass of a monomer mixture including (a) an acrylic acid alkyl ester having an alkyl group having 2 to 14 carbon atoms, (b) a polymerizable unsaturated carboxylic acid and (c) a methacrylic acid alkyl ester for which the glass transition temperature of the homopolymer is 20 to 110° C., in the presence of 0.1 to 10 parts by mass of a reactive surfactant having an ethylenically unsaturated group, copolymerizable with (a) to (c).

The addition amount of the other resins in relation to 100 parts by mass of the total amount of the acid-modified polyolefin resin (A), the rubber component (B) and the tackifier component (C) is preferably 0.1 to 300 parts by mass, more preferably 3 to 200 parts by mass and particularly preferably 5 to 100 parts by mass.

The addition of a cross-linking agent or a vulcanizing agent to the aqueous dispersion of the present invention enables to more improve the adhesiveness of the aqueous dispersion or to improve the heat-resistant adhesiveness of the aqueous dispersion.

Examples of the usable cross-linking agent include a cross-linking agent having self-crosslinkability, a cross-linking agent having in the molecule thereof a plurality of functional groups reacting with a carboxyl group, and a metal complex having multivalent coordination positions. Specific examples of the cross-linking agent include: hydrazide compounds, isocyanate compounds, block isocyanate compounds, melamine compounds, urea compounds, epoxy compounds, carbodiimide compounds, oxazoline group-containing compounds, zirconium salt compounds, silane coupling agents and organic peroxides; these cross-linking agents may also be used in combination with each other. The cross-linking agent may be either a low molecular weight compound or a polymer type compound.

Among these, the cross-linking agents having in the molecule thereof a plurality of functional groups reacting with a carboxyl group are more preferable. Examples of such cross-linking agents include oxazoline compounds, epoxy compounds, carbodiimide compounds, isocyanate compounds, hydrazide compounds, amine compounds, melamine compounds, and polyol; oxazoline compounds, hydrazide compound, amine compounds, carbodiimide compounds and isocyanate compounds are preferable because of being excellent in cross-linking effect, and oxazoline compounds, hydrazide compounds and amine compounds are particularly preferable.

The addition amount of the cross-linking agent, in relation to 100 parts by mass of the total amount of (A), (B) and (C), in terms of the solid content of the cross-linking agent, is preferably 0.01 to 300 parts by mass, more preferably 0.1 to 100 parts by mass, furthermore preferably 0.2 to 50 parts by mass and particularly preferably 0.5 to 30 parts by mass.

As the vulcanizing agent, heretofore known vulcanizing agents can be used; for example, zinc oxide, sulfur and peroxides can be preferably used. The addition amount of the vulcanizing agent, in relation to 100 parts by mass of the rubber component (B), in terms of the solid content of the vulcanizing agent, is preferably 0.01 to 10 parts by mass.

Examples of the inorganic fine particles include: fine particles of metal oxides such as magnesium oxide, tin oxide and titanium oxide; and inorganic particles of calcium carbonate, silica, barium sulfate, calcium silicate, zeolite, kaolinite, halloysite, magnesium carbonate, calcium sulfate, mica, talc, pseudoboehmite, alumina, aluminum silicate, calcium silicate, magnesium silicate, zirconium oxide, zirconium hydroxide, cerium oxide, lanthanum oxide and yttrium oxide. These may be used each alone, or as mixtures of two or more thereof.

The average particle size of the inorganic fine particles is, from the viewpoint of the dispersion stability of the aqueous dispersion, preferably 0.0005 to 100 μm and more preferably 0.005 to 10 μm.

To the aqueous dispersion of the present invention, if necessary, for example, the following may also be added: various chemicals such as a leveling agent, an antifoaming agent, a foaming preventing agent, a pigment dispersant, an ultraviolet absorber, a catalyst, a photocatalyst, a UV curing agent, a wetting agent, a penetrant, a softener, a thickener, a dispersant, a water repellent agent, an antistatic agent, an antiaging agent, a vulcanization accelerator; a pigment or a dye, carbon black, carbon nanotube and glass fiber. These may be used each alone or in combinations of two or more thereof.

Next, the laminate of the present invention is described.

The laminate of the present invention is formed by laminating a coating film obtained from the aqueous dispersion of the present invention at least on a part of a substrate thereof, and also includes the case where substrates are laminated on each other through the intermediary of the coating film (adhesive layer) obtained from the aqueous dispersion of the present invention.

The aqueous dispersion of the present invention is excellent in the slippage at room temperature, of the coating film obtained by applying and drying the aqueous dispersion. In the laminate of the present invention wherein the coating film obtained from the aqueous dispersion of the present invention is laminated on the substrate, the static friction coefficient (according to ISO8295) in an atmosphere set at 23±2° C. when the coating film is superposed on itself is preferably 1.5 or less, more preferably 1.3 or less, furthermore preferably 1.2 or less, particularly preferably 1.0 or less and most preferably 0.9 or less. The static friction coefficient at around room temperature serves as an index for the stickiness or tackiness of the coating film surface at around room temperature; when the static friction coefficient exceeds 1.5, the coating film surface is sticky even at room temperature, and hence dust sometimes attaches to the coating film surface or sometimes it tends to be difficult to handle the coating film surface (accordingly, the present invention adopts the measurement of the static friction coefficient at 23±2° C.).

Examples of substrate constituting the laminate of the present invention, namely, the adherend material allowing the aqueous dispersion of the present invention to adhere thereto include: sheets, foams and molded articles of rubbers such as natural rubber and synthetic rubbers such as chloroprene rubber, isoprene rubber, urethane rubber, styrene butadiene rubber, butyl rubber, nitrile rubber and ethylene propylene rubber; sheets, foams and molded articles of polyolefin resins such as polypropylene, polypropylene-based copolymer, polyethylene, polyethylene-based copolymer, ethylene-vinyl acetate copolymer and olefin-based thermoplastic elastomer, polyamide resin, polyester resin, polyurethane resin, polyvinyl chloride resin and acrylic resin; fiber, woven fabric, knitted fabric, non-woven fabric; leather materials such as natural leather, artificial leather and synthetic leather; and metals, glass, paper, synthetic paper, wood and concrete. When a foam is used, the foam surface may have a skin layer. Alternatively, when a woven fabric or a knitted fabric is used, the aqueous dispersion soaks from the surface into the interior of the woven fabric or the knitted fabric, and hence, in general, the substrate has excellent adhesiveness, irrespective of the type of the fiber constituting the woven fabric or the knitted fabric.

By using such substrates, a laminate formed by allowing the substrate including a polyolefin resin and the substrate including a rubber to adhere to each other through the intermediary of the coating film obtained from the aqueous dispersion of the present invention can be obtained.

Next, a method for producing a laminate by allowing adherends to adhere to each other through the intermediary of a coating film obtained from the aqueous dispersion of the present invention is described.

As the adhesion method using the aqueous dispersion of the present invention, a heretofore known method can be used. For example, the following method can be adopted: the aqueous dispersion of the present invention is applied to at least a part of the surface of an adherend, then a coating film (adhesive layer) is formed by drying a fraction or the whole of the volatile component of the aqueous medium or the like, and the thus prepared adherends are pressure bonded to each other through the intermediary of the coating films (adhesive layers).

As the method for applying the aqueous dispersion, a heretofore known method can be adopted; examples of such a method include: discharging from a casting head, roll coating, knife coating, airknife coating, gravure roll coating, doctor roll coating, doctor knife coating, curtain flow coating, spray coating, shower coating, wire bar coating, rod coating, dip coating, paint brush coating and brush coating.

The application amount, in terms of the amount of the solid content included in the aqueous dispersion, is preferably 0.2 $g/m^2$ or more, more preferably 1 to 1000 $g/m^2$ and particularly preferably 5 to 500 $g/m^2$. When the application amount is less than 0.2 $g/m^2$, the adhesiveness is sometime degraded.

The method for drying a part or the whole of the volatile component of the aqueous medium or the like can also adopt a heretofore known method; examples of such a method include heat drying using hot air, infrared heater, far infrared heater, microwave or pulsed light using a xenon flash lamp as a light source; natural drying; and vacuum drying. Among these, it is preferable to adopt the heat drying short in drying time and capable of raising the temperature of the obtained adhesive layer. The application and the drying may be performed twice or more if necessary.

The method for pressure bonding adherends to each other through the intermediary of an adhesive layer can also adopt a heretofore known method.

The pressure at the time of pressure bonding is preferably a pressure as high as possible, and is generally preferably 0.01 MPa or more. However, when the pressure is too high, the shapes of the adherends tend to be lost, and hence the upper limit of the pressure at the time of pressure bonding is generally recommended to be set at 50 MPa.

On the other hand, the pressure bonding time is preferably 0.5 to 300 seconds.

The temperature of the adhesive layer at the start of the pressure bonding is preferably set at 40° C. or higher because the adhesiveness can be made satisfactory. Accordingly, it is preferable to perform the pressure bonding after the heat drying while the temperature of the adhesive layer is 40° C. or higher.

When the adherend is allowed to adhere by using the aqueous dispersion of the present invention, an adhesive layer may be formed on the surface of the un-surface treated adherend; however, if necessary, after the adherend is once surface-treated, the adhesive layer may also be formed.

Examples of the adoptable surface treatment include corona discharge treatment, flame plasma treatment, atmospheric pressure plasma treatment, low pressure plasma treatment, ozone treatment, electron beam irradiation treatment, ultraviolet ray irradiation treatment, heat treatment, buffing, primer treatment, anchor coating treatment, acid treatment, alkali treatment, chemical treatment, solvent treatment and delipidation treatment.

In the laminate produced by the foregoing production method or the like, the adherends are allowed to adhere to each other with excellent adhesiveness. The strength (adhesive strength) required for peeling from each other the adherends allowed to adhere to each other through the intermediary of the adhesive layer is somewhat varied depending on the ingredients or the shape of the material; however, usually the strength as measured with a specimen cut to the width of 20 mm is preferably 5 N/20 mm or more, more preferably 10 N/20 mm or more, furthermore preferably 20 N/20 mm or more, particularly preferably 30 N/20 mm or more and most preferably 40 N/20 mm or more or alternatively, most preferably the material failure of the adherend(s) occurs at the time of measurement.

The laminate produced by allowing the adherends to adhere to each other through the intermediary of an adhesive layer is small in the degradation of the adhesive strength when repeatedly subjected to bending in a subfreezing environment (hereinafter, referred to as cold bending), and preferably maintains the adhesive strength even when used in a severe cold environment. The ratio of the adhesive strength of a specimen subjected to the cold bending treatment to the adhesive strength of a specimen not subjected to the cold bending treatment, namely, the adhesive strength retention rate is preferably 50% or more, more preferably 70% or more, particularly preferably 80% or more, furthermore preferably 90% or more and most preferably 95% or more.

The aqueous dispersion of the present invention allows polyolefin resin and rubber to sufficiently adhere to each other, and can be used for producing various laminates, for example, through adhesion between polypropylene resin and rubber, between ethylene-vinyl acetate copolymer and rubber, between polyethylene resin and rubber, between polyolefin-based thermoplastic elastomer and metal, and between polyolefin-based thermoplastic elastomer and polypropylene resin. For example, the aqueous dispersion of the present invention can be used in a wide variety of applications such as application to building materials such adhesion of rubber in conveyor belt, hose and rubber lining, adhesion of vulcanized rubber, production of door panels, adhesion of wallpaper, adhesion of resin molded articles, adhesion of tiles and adhesion of flooring materials; application to commodities such as adhesion of leather necessary for production of bags and gloves, adhesion of fiber and adhesion of resin molded article; application for electric appliances such as adhesion of bases; application for automobiles; application for shoemaking; primer for automobile bumper; primer; and anchor coating agent.

As described above, the aqueous dispersion of the present invention can be used in the application for shoemaking; in particular, the aqueous dispersion can be suitably used as an adhesive for footwear, namely, as an adhesive for constitutional members of footwear as adherends.

As the constitutional members of footwear, the members quoted as adherend materials which the aqueous dispersion of the present invention allows to adhere can be suitably used; specifically, for example, leather material, woven fabric, knitted fabric, polyvinyl chloride resin, polyurethane resin, polyolefin resin and rubber can be preferably used. These may be used each alone or in combinations of two or more thereof.

Next, the method for producing footwear by using the adhesive for footwear of the present invention is described.

The method for producing footwear by using the adhesive for footwear of the present invention can use a heretofore known method. For example, a method can be adopted in which after the adhesive for footwear of the present invention is applied to at least a part of the surface of each of the constitutional members of footwear, a part or the whole of the volatile component of the aqueous medium or the like in the adhesive is dried to form an adhesive layer, and then the constitutional members of the footwear were pressure bonded to each other through the intermediary of the adhesive layers.

As the method for applying the adhesive for footwear of the present invention to at least a part of the surface of a constitutional member of footwear, the foregoing methods presented as the method for applying the aqueous dispersion of the present invention can be adopted; among such methods, methods such as knife coating, paint brush coating and brush coating are preferable. It is to be noted that when the adhesive for footwear of the present invention is applied, the surface of the constitutional member of footwear is not required to be beforehand primer-treated, and sufficient adhesiveness is obtained by directly applying the adhesive for footwear to the surface not primer-treated of a constitutional member. However, the adhesive for footwear may also be applied after performing the primer treatment, if necessary. As the primer in such a case, for example, an aqueous dispersion of an acid-modified polyolefin resin can be preferably used.

The application amount of the adhesive for footwear, in terms of the amount of the solid content included in the adhesive for footwear, is 10 to 1000 g/m$^2$ more preferably 50 to 500 g/m$^2$ and particularly preferably 100 to 200 g/m$^2$. When the application amount is less than 10 g/m$^2$, the adhesiveness required for footwear is not sometimes obtained, and when the application amount exceeds 1000 g/m$^2$, a disadvantage in cost is caused, and the adhesiveness is sometimes degraded.

Next, as the method for forming the adhesive layer by drying a part or the whole of the volatile component of the aqueous medium or the like in the applied adhesive, the foregoing drying methods can be adopted; drying by heating with hot air, infrared heater, far-infrared heater, microwave or pulsed light using a xenon flash lamp as a light source is preferable. Alternatively, a method may also be adopted in which after beforehand drying with hot air, infrared heater, far infrared heater, microwave or the like, heating is performed by irradiation with pulsed light using a xenon flash lamp as a light source. The foregoing application and drying step may also be performed twice or more, if necessary.

The method for pressure bonding the constitutional members to each other through the intermediary of the adhesive layer can also adopt a heretofore known method. The pressure at the time of pressure bonding is preferably a pressure as high as possible, and is generally preferably 0.01 MPa or more. However, when the pressure is too high, the shape of the footwear tends to be lost, and hence the upper limit of the pressure at the time of pressure bonding is generally recommended to be set at 20 MPa. On the other hand, the pressure bonding time is preferably 0.5 to 300 seconds. The temperature of the adhesive layer at the start of the pressure bonding is preferably set at 40° C. or higher because the adhesiveness can be made satisfactory. Accordingly, it is preferable to perform the pressure bonding after the heat drying while the temperature of the adhesive layer is 40° C. or higher.

The footwear of the present invention obtained by using the adhesive for footwear and, for example, with the foregoing production method is excellent in the mutual adhesiveness of the constitutional members. The strength (adhesive strength) required for peeling from each other the constitutional members allowed to adhere to each other through the intermediary of the adhesive layer is somewhat varied depending on the materials or the shapes of the members; however, usually the strength as measured with a specimen cut to the width of 20 mm is preferably 20 N/20 mm or more, more preferably 30 N/20 mm or more, furthermore preferably 40 N/20 mm or more, particularly preferably 50 N/20 mm or more and most preferably 60 N/20 mm or more or alternatively, most preferably the material failure of the adherend(s) occurs at the time of measurement.

The adhesive capable of allowing the constitutional members of footwear to adhere to each other with the foregoing strength is regarded as suitable as the adhesive for footwear.

The adhesive for footwear of the present invention is excellent in the adhesive strength retention in the cold bending, and hence the footwear obtained by using the adhesive for footwear maintains excellent shape stability even in the use in cold regions.

EXAMPLES

Hereinafter, the present invention is specifically described with reference to Examples. However, the present invention is not limited by these Examples.

Various properties were measured or evaluated by the following methods.

1. The properties of the acid-modified polyolefin resin
(1) Constitution

The constitution was determined by the $^1$H-NMR analysis (ECA500, 500 MHz, manufactured by JEOL Ltd.). Tetrachloroethane ($d_2$) was used as a solvent and the measurement was performed at 120° C.

(2) Melting Point

The sample used was 10 mg of the acid-modified polyolefin resin, and the melting point was determined by performing the measurement by using a DSC (differential scanning calorimetry) apparatus (manufactured by Perkin-Elmer Corp., DSC7) and under the condition of the programmed temperature increase rate of 10° C./min.

(3) Melt Flow Rate Value (MFR)

Measurement was performed according to the method described in ISO1133 (at 190° C., under a load of 21.2 N).

2. Properties of Aqueous Dispersion
(1) Number Average Particle Size of Dispersed Particle The number average particle size was determined by using Microtrac Particle Size Distribution Analyzer (UPA150, MODEL No. 9340 manufactured by Nikkiso Co., Ltd., dynamic light scattering method). The refractive index of the resin used for the derivation of the particle size was taken as 1.50.

(2) Alcohol Dilution Stability

To 20 g of the aqueous dispersion, 20 g of an isopropanol aqueous solution having an isopropanol concentration of 70% by mass was slowly dropwise added under the condition of being stirred, and the state of the aqueous dispersion was visually evaluated on the basis of the following indexes.

G(Good): No aggregation occurs at all.
A(Average): Somewhat aggregation can be identified.
P(Poor): Most of the solid content is aggregated.

3. Properties of Coating Film (Adhesive Layer)
(1) Slippage (Static Friction Coefficient)

The aqueous dispersion was applied to the corona treated surface of a polyethylene terephthalate (hereinafter, referred to as PET) film having a thickness of 100 μm, so as for the coating film thickness after drying to fall within a range from 3 to 10 μm, and dried at 100° C. for 2 minutes. By using the resulting coated film (laminate), the static friction coefficient was measured according to ISO8295 (atmosphere temperature: 23±2° C., load: 19.6N, tensile rate: 100 mm/min). It is to be noted that, the coated surface of the coated film was superimposed on itself and the static friction coefficient was evaluated (the friction coefficient of the coating film against itself was determined).

(2) Rubber/Rubber Adhesiveness

One surface of a 100 mm×50 mm×2 mm styrene butadiene rubber (hereinafter, referred to as SBR) sheet (black) was subjected to buffing, and buffing residue was removed by air blowing; such two SBR sheets were prepared, and the aqueous dispersion was applied with a brush to each of the buffed surfaces so as for the coating amount to be 100 g (solid content mass)/m$^2$. Next, the sheets were introduced into a hot air dryer and dried at 90° C. for 20 minutes to form adhesive layers. Immediately after the drying, the adhesive layers of the two SBR sheets were bonded to each other and were press bonded under a pressure of 2 MPa for 20 seconds with a press machine to yield a laminate.

The obtained laminate was allowed to stand still at room temperature for 24 hours, and cut to a width of 20 mm to yield a specimen of 20 mm width×100 mm length. Next, the strength (adhesive strength) required for peeling off the two SBR sheets in the specimen was measured by using a tensile testing machine (Intesco Precision Universal Material Tester, model 2020, manufactured by Intesco Co., Ltd.), under the conditions of a tensile rate of 50 mm/min, T-peeling and 25° C. The measurement was performed five times, and the average value was taken as the adhesiveness.

(3) Polypropylene Resin/Rubber Adhesiveness

One surface of a 100 mm×50 mm×3 mm polypropylene resin (hereinafter, referred to as PP) molded article was subjected to buffing, buffing residue was removed by air blowing, then the buffed surface was corona treated, and thus, a PP molded article with a buffed and corona treated surface was prepared; one surface of a 100 mm×50 mm×2 mm SBR sheet (black) was subjected to buffing, buffing residue was removed by air blowing, and thus a SBR sheet with a buffed and buffing residue removed surface was prepared; the aqueous dispersion was applied with a brush to each of the buffed surfaces so as for the coating amount to be 100 g (solid content mass)/m$^2$. Next, the PP molded article and the SBR sheet were introduced into a hot air dryer and dried at 90° C. for 20 minutes to form the adhesive layer of the PP molded article and the adhesive layer of the SBR sheet. Immediately after the drying, the adhesive layers of the PP molded article and the SBR sheet were bonded to each other and were press bonded under a pressure of 2 MPa for 20 seconds with a press machine to yield a laminate.

The obtained laminate was allowed to stand still at room temperature for 24 hours, and cut to a width of 20 mm to yield a specimen of 20 mm width×100 mm length. Next, the strength (adhesive strength) required for peeling off the PP molded article and the SBR sheet in the specimen was measured by using a tensile testing machine (Intesco Precision Universal Material Tester, model 2020, manufactured by Intesco Co., Ltd.), under the conditions of a tensile rate of 50 mm/min, a 180°-peeling and 25° C. The measurement was performed five times, and the average value was taken as the adhesiveness.

(4) EVA/Rubber Adhesiveness

A 100 mm×50 mm×5 mm ethylene-vinyl acetate resin (vinyl acetate content 30% by mass, hereinafter referred to as EVA) foam was prepared; one surface of a 100 mm×50 mm×2 mm SBR sheet (black) was subjected to buffing, buffing residue was removed by air blowing, and thus a SBR sheet with a buffed and buffing residue removed surface was prepared;

the aqueous dispersion was applied with a brush to one surface of the EVA foam and the buffed surface of the SBR sheet so as for the coating amount to be 100 g (solid content mass)/m². Next, the EVA foam and the SBR sheet were introduced into a hot air dryer and dried at 90° C. for 20 minutes to form the adhesive layer of the EVA foam and the adhesive layer of the SBR sheet. Immediately after the drying, the adhesive layers of the EVA foam and the SBR sheet were bonded to each other and were press bonded under a pressure of 2 MPa for 20 seconds with a press machine to yield a laminate.

The obtained laminate was allowed to stand still at room temperature for 24 hours, and cut to a width of 20 mm to yield a specimen of 20 mm width×100 mm length. Next, the strength (adhesive strength) required for peeling off the EVA foam and the SBR sheet in the specimen was measured by using a tensile testing machine (Intesco Precision Universal Material Tester, model 2020, manufactured by Intesco Co., Ltd.), under the conditions of a tensile rate of 50 mm/min, T-peeling and 25° C. The measurement was performed five times, and the average value was taken as the adhesiveness.

(5) EVA/Leather Adhesiveness

A 100 mm×50 mm×5 mm EVA foam and a 100 mm×50 mm×2 mm sheet of cowhide (natural leather) were prepared; the aqueous dispersion was applied with a brush to one surface of the EVA foam and the suede finish surface of the sheet of cowhide so as for the coating amount to be 100 g (solid content mass)/m². Next, the EVA foam and the sheet of cowhide were introduced into a hot air dryer and dried at 90° C. for 20 minutes to form the adhesive layer of the EVA foam and the adhesive layer of the sheet of cowhide. Immediately after the drying, the adhesive layers of the EVA foam and the sheet of cowhide were bonded to each other and were press bonded under a pressure of 2 MPa for 20 seconds with a press machine to yield a laminate.

The obtained laminate was allowed to stand still at room temperature for 24 hours, and cut to a width of 20 mm to yield a specimen of 20 mm width×100 mm length. Next, the strength (adhesive strength) required for peeling off the EVA foam and the sheet of cowhide in the specimen was measured by using a tensile testing machine (Intesco Precision Universal Material Tester, model 2020, manufactured by Intesco Co., Ltd.), under the conditions of a tensile rate of 50 mm/min, T-peeling and 25° C. The measurement was performed five times, and the average value was taken as the adhesiveness.

(6) Polyurethane Resin/Woven Fabric Adhesiveness

One surface of a 100 mm×50 mm×2 mm polyurethane resin (hereinafter, PU) sheet was subjected to buffing, buffing residue was removed by air blowing, and thus a PU sheet with a buffed and buffing residue removed surface was prepared; a 100 mm×50 mm×1 mm sheet of canvas (hemp woven fabric) was prepared; the aqueous dispersion was applied with a brush to each of the buffed surface of the PU sheet and the hemp woven surface of the sheet of canvas so as for the coating amount to be 100 g (solid content mass)/m². Next, the PU sheet and the sheet of canvas were introduced into a hot air dryer and dried at 90° C. for 20 minutes to form the adhesive layer of the PU sheet and the adhesive layer of the sheet of canvas. Immediately after the drying, the adhesive layers of the PU sheet and the sheet of canvas were bonded to each other and were press bonded under a pressure of 2 MPa for 20 seconds with a press machine to yield a laminate.

The obtained laminate was allowed to stand still at room temperature for 24 hours, and cut to a width of 20 mm to yield a specimen of 20 mm width×100 mm length. Next, the strength (adhesive strength) required for peeling off the PU sheet and the sheet of canvas in the specimen was measured by using a tensile testing machine (Intesco Precision Universal Material Tester, model 2020, manufactured by Intesco Co., Ltd.), under the conditions of a tensile rate of 50 mm/min, T-peeling and 25° C. The measurement was performed five times, and the average value was taken as the adhesiveness.

(7) Adhesive Strength Retention Rate in Cold Bending

On the basis of the method described in the foregoing "(2) rubber/rubber adhesiveness," a specimen having a constitution of SBR sheet/SBR sheet was prepared.

The obtained specimen was subjected to the following cold bending treatment three times.

Then, the specimen was allowed to stand still at room temperature for 24 hours, and the strength (adhesive strength) required for peeling off the SBR sheets in the specimen from each other was measured by using a tensile testing machine (Intesco Precision Universal Material Tester, model 2020, manufactured by Intesco Co., Ltd.), under the conditions of a tensile rate of 50 mm/min, T-peeling and 25° C. The measurement was performed five times, the average value of the measured values was obtained and the resulting average value was taken as "the adhesive strength of the specimen subjected to cold bending treatment." The average value of the adhesive strengths measured in the foregoing "(2) rubber/rubber adhesiveness" was taken as "the adhesive strength of the specimen not subjected to cold bending treatment," and the adhesive strength retention rate was determined from these values on the basis of the following formula (I).

Cold bending treatment: The specimen was allowed to stand still in a cold room set at −40° C. for 2 hours; then, in an environment of −40° C., the whole of the specimen was wound around a cylinder of 5 mm in radius so as for the 20-mm side of the specimen to be parallel to the axis direction of the cylinder and then immediately wound off. The winding and winding off operation was repeated five times.

Adhesive strength retention rate (%)=adhesive strength of the specimen subjected to cold bending treatment/adhesive strength of the specimen not subjected to cold bending treatment×100 (1)

The aqueous dispersion (I) of the acid-modified polyolefin resin was produced by the following method.

<Production of Aqueous Dispersion of Ethylene-Ethyl Acrylate-Maleic Anhydride Copolymer>

On the basis of the methods described in G.B. Patent No. 2091745, U.S. Pat. No. 4,617,366 and U.S. Pat. No. 4,644,044, the ethylene-ethyl acrylate-maleic anhydride copolymers PO1, PO2 and PO3 were produced. The properties of PO1, PO2 and PO3 are shown in Table 1.

Subsequently, in a 1-liter capacity glass vessel equipped with a stirrer and a heater, 100 g of PO1, PO2 or PO3 obtained as described above, 100 g of isopropanol, 5 g of 2-dimethylaminoethanol and 295 g of distilled water were placed. When the resulting mixture was stirred by setting the rotational speed of a stirring blade at 300 rpm, no precipitation of the resin granular material was found on the bottom of the vessel and thus it was verified that the mixture was in a suspension state. Consequently, while this state was being maintained, after an elapse time of 10 minutes, the power source of the heater was turned on to heat the mixture. While the temperature inside the reaction system was maintained at 120° C., the mixture was stirred for 120 minutes to achieve dispersion. Subsequently, the mixture was cooled down to about 80° C. while the mixture was being stirred with the rotational speed still set at 300 rpm, and then the pressure inside the reaction system was gradually reduced to remove isopropanol and water. After isopropanol and water were removed in a sum amount of 180 g or more, when the temperature inside the reaction system reached 35° C., water was added to the mixture to regulate the solid content concentration of the resulting aqueous dispersion so as to be 30% by mass, and the aqueous dispersion was pressure filtered with a 180-mesh stainless steel filter to yield a milky-white uniform aqueous dispersion of PO1, PO2 or PO3. The number average particle sizes of the aqueous dispersions of PO1, PO2 and PO3 were within a range from 0.07 to 0.08 μm.

<Production of Aqueous Dispersion of Ethylene-Propylene-Butene-Maleic Anhydride Copolymer>

On the basis of the method described in International Publication No. 2004/104090, ethylene-propylene-butene-maleic anhydride copolymer PO4 was produced. The properties of PO4 are shown in Table 1.

Subsequently, in a 1-liter capacity glass vessel equipped with a stirrer and a heater, 75 g of PO4 obtained as described above, 150 g of tetrahydrofuran, 8 g of 2-dimethylaminoethanol and 267 g of distilled water were placed. When the resulting mixture was stirred by setting the rotational speed of a stirring blade at 300 rpm, no precipitation of the resin granular material was found on the bottom of the vessel and thus it was verified that the mixture was in a suspension state. Consequently, while this state was being maintained, after an elapse time of 10 minutes, the power source of the heater was turned on to heat the mixture. While the temperature inside the reaction system was maintained at 130° C., the mixture was further stirred for 120 minutes to achieve dispersion. Subsequently, the mixture was cooled down to about 80° C. while the mixture was being stirred with the rotational speed still set at 300 rpm, and then the pressure inside the reaction system was gradually reduced to remove tetrahydrofuran and water. After tetrahydrofuran and water were removed in a sum amount of 250 g or more, when the temperature inside the reaction system reached 35° C., water was added to the mixture to regulate the solid content concentration of the resulting aqueous dispersion so as to be 30% by mass, and the aqueous dispersion was pressure filtered with a 180-mesh stainless steel filter to yield a milky-white uniform aqueous dispersion of PO4. The number average particle size of the aqueous dispersion of PO4 was 0.12 μm.

<Production of Aqueous Dispersions of Ethylene-(Meth) Acrylic Acid Copolymers>

An ethylene-methacrylic acid copolymer (Nuclel N0903HC, hereinafter referred to as N0903HC, manufactured by Du Pont-Mitsui Polychemicals Co., Ltd.), an ethylene-methacrylic acid copolymer (Nuclel AN42115C, hereinafter referred to as AN42115C, manufactured by Du Pont-Mitsui Polychemicals Co., Ltd.), an ethylene-methacrylic acid copolymer (Nuclel N1560, hereinafter referred to as N1560, manufactured by Du Pont-Mitsui Polychemicals Co., Ltd.), an ethylene-acrylic acid copolymer (Primacor 5990, hereinafter referred to as 5990, manufactured by Dow Chemical Co.) were used, and the aqueous dispersions of these ethylene-(meth)acrylic acid copolymers are produced by the following methods. The properties of N0903HC, AN42115C, N1560 and 5990 are shown in Table 1.

(Production of Aqueous Dispersions of N0903HC and AN42115C)

In a 1-liter capacity glass vessel equipped with a stirrer and a heater, 75 g of N0903HC or AN42115C, 175 g of n-propanol, 20 g of 2-dimethylaminoethanol and 230 g of distilled water were placed. When the resulting mixture was stirred by setting the rotational speed of a stirring blade at 300 rpm, no precipitation of the resin granular material was found on the bottom of the vessel and thus it was verified that the mixture was in a suspension state. Consequently, while this state was being maintained, after an elapse time of 10 minutes, the power source of the heater was turned on to heat the mixture. While the temperature inside the reaction system was maintained at 150° C., the mixture was further stirred for 120 minutes to achieve dispersion. Subsequently, the mixture was cooled down to about 80° C. while the mixture was being stirred with the rotational speed still set at 300 rpm, then 200 g of water was added to the dispersion, and then the pressure inside the reaction system was gradually reduced to remove n-propanol and water. After n-propanol and water were removed in a sum amount of 350 g or more, when the temperature inside the reaction system reached 35° C., water was added to the mixture to regulate the solid content concentration of the resulting aqueous dispersion so as to be 20% by mass, and the aqueous dispersion was pressure filtered with a 180-mesh stainless steel filter to yield a milky-white uniform aqueous dispersion of N0903HC or AN42115C. The number average particle sizes of the aqueous dispersions of N0903HC and AN42115C were within a range from 0.18 to 0.20 μm.

(Production of Aqueous Dispersions of N1560 and 5990)

In a 1-liter capacity glass vessel equipped with a stirrer and a heater, 75 g of N1560 or 5990, 50 g of isopropanol, 7 g of 2-dimethylaminoethanol and 368 g of distilled water were placed. When the resulting mixture was stirred by setting the rotational speed of a stirring blade at 300 rpm, no precipitation of the resin granular material was found on the bottom of the vessel and thus it was verified that the mixture was in a suspension state. Consequently, while this state was being maintained, after an elapse time of 10 minutes, the power source of the heater was turned on to heat the mixture. While the temperature inside the reaction system was maintained at 130° C., the mixture was further stirred for 120 minutes to achieve dispersion. Subsequently, the mixture was cooled down to about 80° C. while the mixture was being stirred with the rotational speed still set at 300 rpm, and then the pressure inside the reaction system was gradually reduced to remove isopropanol and water. After isopropanol and water were removed in a sum amount of 125 g or more, when the temperature inside the reaction system reached 35° C., water was added to the mixture to regulate the solid content concentration of the resulting aqueous dispersion so as to be 20% by mass, and the aqueous dispersion was pressure filtered with a 180-mesh stainless steel filter to yield a milky-white uniform aqueous dispersion of N1560 or 5990. The number average particle sizes of the aqueous dispersions of N1560 and 5990 were within a range from 0.04 to 0.05 μm.

The properties of the acid-modified polyolefin resins used are shown in Table 1.

TABLE 1

| Acid-modified polyolefin resin | Monomer constitution (% by mass) | | | | | | | Properties | |
|---|---|---|---|---|---|---|---|---|---|
| | Olefin components | | | Unsaturated carboxylic acid component | | | Other component | MFR | Melting point |
| | Ethylene | Propylene | Butene | Maleic anhydride | Methacrylic acid | Acrylic acid | Ethyl acrylate | g/10 min | ° C. |
| PO1 | 85.0 | 0 | 0 | 3.0 | 0 | 0 | 12.0 | 3 | 80 |
| PO2 | 80.0 | 0 | 0 | 2.5 | 0 | 0 | 17.5 | 60 | 95 |
| PO3 | 90.0 | 0 | 0 | 2.5 | 0 | 0 | 7.5 | 200 | 100 |
| PO4 | 11.0 | 63.0 | 22.0 | 4.0 | 0 | 0 | 0 | 300 | 100 |

TABLE 1-continued

| Acid-modified polyolefin resin | Monomer constitution (% by mass) | | | | | | Other component | Properties | |
|---|---|---|---|---|---|---|---|---|---|
| | Olefin components | | | Unsaturated carboxylic acid component | | | | MFR | Melting |
| | Ethylene | Propylene | Butene | Maleic anhydride | Methacrylic acid | Acrylic acid | Ethyl acrylate | g/10 min | point °C. |
| N0903HC | 91.0 | 0 | 0 | 0 | 9.0 | 0 | 0 | 3 | 100 |
| AN42115C | 95.0 | 0 | 0 | 0 | 5.0 | 0 | 0 | 33 | 95 |
| N1560 | 85.0 | 0 | 0 | 0 | 15.0 | 0 | 0 | 60 | 90 |
| 5990 | 80.0 | 0 | 0 | 0 | 0 | 20.0 | 0 | 1300 | 75 |

In the table, the values given in % by mass are the values relative to 100% by mass of the acid-modified polyolefin resin.

The additives added to the aqueous dispersion of the present invention were produced by the following methods.

<Production of Aqueous Dispersion of Acrylic Resin>

In a reaction vessel equipped with a stirrer, a thermometer, a nitrogen seal tube and a condenser, 250 g of distilled water was placed and the air in the reaction system was replaced with nitrogen for 1 hour while the distilled water was being stirred. To the thus treated distilled water, 1.5 g of ammonium persulfate (polymerization initiator) was added, the temperature of the ammonium persulfate-containing distilled water was set at 60° C., and then, a mixture composed of 500 g of n-butyl acrylate, 50 g of isobutyl methacrylate, 10 g of acrylic acid, 0.5 g of n-dodecyl mercaptan (chain transfer agent) and 20 g of sulfosuccinic acid diester ammonium salt 20 g and emulsified with 120 g of water was dropwise added to the ammonium persulfate-containing distilled water over 3 hours to performed emulsion polymerization to yield an aqueous dispersion of an acrylic resin.

<Production of Aqueous Dispersion of Polyurethane Resin>

In a reactor equipped with a stirrer, a thermometer, a nitrogen seal tube and a condenser, 345 g of a polytetramethylene glycol having a number average molecular weight of 1970, 77.8 g of isophorone diisocyanate and 0.03 g of dibutyltin dilaurate were placed, and the resulting mixture was allowed to react at 80° C. for 2 hours. Subsequently, the resulting reaction solution was cooled down to 50° C., then 11.7 g of 3-dimethylaminopropanol, 8.85 g of triethylamine and 177 g of acetone were added to the reaction solution, and the reaction solution was allowed to react for 3 hours. To the reaction solution, 175 g of acetone was further added and the reaction solution was cooled down to 30° C.; to the reaction solution, a mixed solution composed of 13.4 g of isophorone diisocyanate, 1.07 g of monoethanolamine, 87.9 g of isopropanol and 1039 g of water mixing was added, and stirred at a high speed to distill off acetone and water and isopropanol from the solution, and thus an aqueous dispersion (solid content concentration: 50% by mass) of a polyether-type polyurethane resin was obtained.

Example 1

As the aqueous dispersion (I) of the acid-modified polyolefin resin (A), the aqueous dispersion of the ethylene-ethyl acrylate-maleic anhydride copolymer PO1 was used.

As the aqueous dispersion (II) of the rubber component (B), a polychloroprene latex (hereinafter referred to as GFL280) was used which was obtained by regulating a chloroprene-methacrylic acid copolymer latex (Skyprene GFL-280, manufactured by Tohso Corp., solid content concentration: 55% by mass, number average particle size: 0.1 μm) at pH8 with 2-dimethylaminoethanol, and then by adding, to the thus regulated latex, a zinc oxide aqueous dispersion (AZ-SW, manufactured by Yamazaki-Kougyo Co., Ltd.) in such a way that the amount of zinc oxide was 3 parts by mass in relation to 100 parts by mass of the solid content of Skyprene GFL-280.

As the aqueous dispersion (III) of the tackifier component (C), an aqueous dispersion of a terpene phenol-based tackifier component (Tamanol E-200NT, hereinafter referred to as E200NT, manufactured by Arakawa Chemical Industries, Ltd., solid content concentration: 53% by mass, number average particle size: 0.25 μm, softening point: 150° C.) was used.

GFL-280 and the aqueous dispersion of PO1 were mixed with each other in such a way that the solid content of GFL-280 was 5 parts by mass in relation to 100 parts by mass of the solid content of the aqueous dispersion of PO1; then the mixed solution of (A) and (B) and E200NT were mixed with each other in such a way that the solid content of E200NT was 50 parts by mass in relation to 100 parts by mass of the solid content of the mixed solution of (A) and (B). To the mixed solution of (A), (B) and (C), water was added in such a way that the solid content concentration of the resulting mixed solution of (A), (B) and (C) was 30% by mass, and thus an aqueous dispersion including (A), (B) and (C) was obtained. It is to be noted that each of the foregoing mixing operations was performed under stirring.

Examples 2 to 13

In each of Examples 2 to 13, an aqueous dispersion including (A), (B) and (C) was obtained by the same operation as in Example 1 except that the mixing amounts of the acid-modified polyolefin resin (A), the rubber component (B) and the tackifier component (C) were specified to be the amounts shown in Table 2.

Example 14

An aqueous dispersions including (A), (B) and (C) was obtained by the same operation as in Example 3 except that as the aqueous dispersion (I) of the acid-modified polyolefin resin (A), the aqueous dispersion of the ethylene-methacrylic acid copolymer N0903HC was used.

Example 15

An aqueous dispersion including (A), (B) and (C) was obtained by the same operation as in Example 3 except that as the aqueous dispersion (I) of the acid-modified polyolefin resin (A), the aqueous dispersion of the ethylene-methacrylic acid copolymer AN42115C was used.

Example 16

The aqueous dispersion including (A), (B) and (C) was obtained by the same operation as in Example 3 except that as the aqueous dispersion (I) of the acid-modified polyolefin resin (A), the aqueous dispersion of the ethylene-ethyl acrylate-maleic anhydride copolymer PO2 was used.

Example 17

The aqueous dispersion including (A), (B) and (C) was obtained by the same operation as in Example 3 except that as the aqueous dispersion (I) of the acid-modified polyolefin resin (A), the aqueous dispersion of the ethylene-ethyl acrylate-maleic anhydride copolymer PO3 was used.

Example 18

The aqueous dispersion including (A), (B) and (C) was obtained by the same operation as in Example 3 except that as the aqueous dispersion (I) of the acid-modified polyolefin resin (A), the aqueous dispersion of the ethylene-propylene-butene-maleic anhydride copolymer PO4 was used.

Example 19

The aqueous dispersion including (A), (B) and (C) was obtained by the same operation as in Example 3 except that as the aqueous dispersion (II) of the rubber component (B), a styrene-butadiene-ethylhexyl acrylate copolymer latex (L7430 manufactured by Asahi Kasei Chemicals Corp., solid content concentration: 50% by mass, number average particle size: 0.15 μm) was used.

Example 20

The aqueous dispersion including (A), (B) and (C) was obtained by the same operation as in Example 3 except that as the aqueous dispersion (III) of the tackifier component (C), an aqueous dispersion of a rosin ester-based tackifier component (Tamanol E-650, hereinafter referred to as E-650, manufactured by Arakawa Chemical Industries, Ltd., solid content concentration: 50% by mass, number average particle size: 0.2 μm, softening point: 160° C.) was used.

Example 21

To the aqueous dispersion including (A), (B) and (C) obtained by the same operation as in Examples 3, the aqueous dispersion of the acrylic resin obtained in the production of the aqueous dispersion of the acrylic resin was added as an additive, in such a way that the solid content was 10 parts by mass in relation to 100 parts by mass of the total amount of (A), (B) and (C) in the dispersion including (A), (B) and (C), and the resulting mixture was stirred to yield an aqueous dispersion including (A), (B), (C) and the acrylic resin.

Example 22

An aqueous dispersion including (A), (B), (C) and a polyurethane resin was obtained by the same operation as in Examples 21 except that the aqueous dispersion of the polyurethane resin obtained in the production of the aqueous dispersion of the polyurethane resin was used as an additive.

Example 23

An aqueous dispersion including (A), (B), (C) and WD730 (defined as follows) was obtained by the same operation as in Example 21 except that a water dispersion-type polyisocyanate compound (Takenate WD-730, hereinafter referred to as WD730, manufactured by Takeda Pharmaceutical Co., Ltd., isocyanate group content (by percentage) 18.6% by mass) was used as an additive and the content of WD730 was made to be 3 parts by mass in relation to 100 parts by mass of the total amount of the solid contents of (A), (B) and (C).

Example 24

An aqueous dispersion including (A), (B) (C) and ADH (defined as follows) was obtained by the same operation as in Example 23 except that adipic acid dihydrazide (hereinafter referred to as ADH, manufactured by Otsuka Chemical Co., Ltd.) was used as an additive.

Comparative Example 1

The aqueous dispersion of PO1 was used as the aqueous dispersion (I) of the acid-modified polyolefin resin (A), E200NT was used as the aqueous dispersion (III) of the tackifier component (C), and the aqueous dispersion of PO1 and E200NT were mixed with each other in such a way that the solid content of E200NT was 50 parts by mass in relation to 100 parts by mass of the solid content of the aqueous dispersion of PO1. To the mixed solution of (A) and (C), water was added in such a way that the solid content concentration of the resulting mixed solution of (A) and (C) was 30% by mass, and thus an aqueous dispersion including (A) and (C) was obtained. It is to be noted that each of the foregoing mixing operations was performed under stirring.

Comparative Example 2

GFL280 was used as the aqueous dispersion (II) of the rubber component (B), E200NT was used as the aqueous dispersion (III) of the tackifier component (C), and GFL280 and E200NT were mixed with each other in such a way that the solid content of E200NT was 50 parts by mass in relation to 100 parts by mass of the solid content of GFL280. To the mixed solution of (B) and (C), water was added in such a way that the solid content concentration of the resulting mixed solution of (B) and (C) was 30% by mass, and thus an aqueous dispersion including (B) and (C) was obtained. It is to be noted that each of the foregoing mixing operations was performed under stirring.

Comparative Example 3

The aqueous dispersion of PO1 was used as the aqueous dispersion (I) of the acid-modified polyolefin resin (A), GFL280 was used as the aqueous dispersion (II) of the rubber component (B), and the aqueous dispersion of PO1 and GFL280 were mixed with each other in such a way that the solid content of GFL-280 was 100 parts by mass in relation to 100 parts by mass of the solid content of the aqueous dispersion of PO1. To the mixed solution of (A) and (B), water was added in such a way that the solid content concentration of the resulting mixed solution of (A) and (B) was 30% by mass, and thus an aqueous dispersion including (A) and (B) was obtained. It is to be noted that each of the foregoing mixing operations was performed under stirring.

Comparative Examples 4 and 5

In each of Examples 4 and 5, an aqueous dispersion including (A), (B) and (C) was obtained by the same operation as in Example 1 except that the mixing amounts of the acid-modified polyolefin resin (A), the rubber component (B) and the tackifier component (C) were specified to be the amounts shown in Table 2.

Comparative Example 6

An aqueous dispersion including (A), (B) and (C) was obtained by the same operation as in Example 3 except that as the aqueous dispersion (I) of the acid-modified polyolefin resin (A), the aqueous dispersion of the ethylene-methacrylic acid copolymer N1560 was used.

Comparative Example 7

An aqueous dispersion including (A), (B) and (C) was obtained by the same operation as in Example 3 except that as the aqueous dispersion (I) of the acid-modified polyolefin resin (A), the aqueous dispersion of the ethylene-acrylic acid copolymer 5990 was used.

Various evaluations were performed using the aqueous dispersions obtained in Examples 1 to 24 and Comparative Examples 1 to 7. The evaluation results thus obtained are shown in Table 2.

TABLE 2

| | Aqueous dispersion composition | | | | | | | Aqueous dispersion properties | |
|---|---|---|---|---|---|---|---|---|---|
| | Acid-modified polyolefin resin (A) | Robber component (B) | | Tackifier component (C) | | Additive | | Number average particle size | Alcohol dilution |
| | Type | Type | parts*1 | Type | parts*2 | Type | parts*3 | (μm) | stability |
| Examples | | | | | | | | | |
| 1 | PO1 | GFL280 | 5 | E200NT | 50 | — | 0 | 0.09 | G |
| 2 | PO1 | GFL280 | 20 | E200NT | 50 | — | 0 | 0.10 | G |
| 3 | PO1 | GFL280 | 100 | E200NT | 50 | — | 0 | 0.10 | G |
| 4 | PO1 | GFL280 | 500 | E200NT | 50 | — | 0 | 0.09 | G |
| 5 | PO1 | GFL280 | 1900 | E200NT | 50 | — | 0 | 0.09 | A |
| 6 | PO1 | GFL280 | 100 | E200NT | 5 | — | 0 | 0.08 | A |
| 7 | PO1 | GFL280 | 100 | E200NT | 10 | — | 0 | 0.08 | G |
| 8 | PO1 | GFL280 | 100 | E200NT | 100 | — | 0 | 0.13 | G |
| 9 | PO1 | GFL280 | 100 | E200NT | 300 | — | 0 | 0.17 | G |
| 10 | PO1 | GFL280 | 5 | E200NT | 5 | — | 0 | 0.08 | G |
| 11 | PO1 | GFL280 | 5 | E200NT | 300 | — | 0 | 0.18 | G |
| 12 | PO1 | GFL280 | 1900 | E200NT | 5 | — | 0 | 0.09 | A |
| 13 | PO1 | GFL280 | 1900 | E200NT | 300 | — | 0 | 0.18 | A |
| 14 | N0903HC | GFL280 | 100 | E200NT | 50 | — | 0 | 0.13 | G |
| 15 | AN42115C | GFL280 | 100 | E200NT | 50 | — | 0 | 0.09 | G |
| 16 | PO2 | GFL280 | 100 | E200NT | 50 | — | 0 | 0.09 | G |
| 17 | PO3 | GFL280 | 100 | E200NT | 50 | — | 0 | 0.09 | G |
| 18 | PO4 | GFL280 | 100 | E200NT | 50 | — | 0 | 0.14 | G |
| 19 | PO1 | L7430 | 100 | E200NT | 50 | — | 0 | 0.12 | G |
| 20 | PO1 | GFL280 | 100 | E650 | 50 | — | 0 | 0.16 | G |
| 21 | PO1 | GFL280 | 100 | E200NT | 50 | Acrylic resin | 10 | 0.10 | G |
| 22 | PO1 | GFL280 | 100 | E200NT | 50 | Polyurethane resin | 10 | 0.09 | G |
| 23 | PO1 | GFL280 | 100 | E200NT | 50 | WD730 | 3 | 0.10 | G |
| 24 | PO1 | GFL280 | 100 | E200NT | 50 | ADH | 3 | 0.11 | G |
| Comparative Examples | | | | | | | | | |
| 1 | PO1 | — | 0 | E200NT | 50 | — | 0 | 0.09 | G |
| 2 | — | GFL280/E200NT = 100/50 | | | | — | 0 | 0.10 | P |
| 3 | PO1 | GFL280 | 100 | — | 0 | — | 0 | 0.07 | G |
| 4 | PO1 | GFL280 | 100 | E200NT | 500 | — | 0 | 0.20 | G |
| 5 | PO1 | GFL280 | 3900 | E200NT | 50 | — | 0 | 0.09 | P |
| 6 | N1560 | GFL280 | 100 | E200NT | 50 | — | 0 | 0.07 | A |
| 7 | 5990 | GFL280 | 100 | E200NT | 50 | — | 0 | 0.07 | A |

| | Coating film properties | | | | | Adhesive strength |
|---|---|---|---|---|---|---|
| | Static friction coefficient | Adhesiveness (N/20 mm) | | | | retention rate in cold bending (%) |
| | | Rubber/rubber | PP/rubber | EVA/rubber | EVA/leather | PU/woven fabric | |
| Examples | | | | | | | |
| 1 | 0.8 | 33 | 14 | 21 | 36 | 17 | 51 |
| 2 | 0.8 | 35 | 26 | 46 | 56 | 39 | 83 |
| 3 | 0.8 | 43 | 38 | Material failure | Material failure | 53 | 97 |
| 4 | 0.9 | 45 | 30 | Material failure | Material failure | 42 | 101 |
| 5 | 1.3 | 36 | 17 | 24 | 49 | 25 | 67 |
| 6 | 0.5 | 21 | 14 | 22 | 28 | 18 | 50 |

TABLE 2-continued

|    | *1  |    |    |              |              |    |     |
| -- | --- | -- | -- | ------------ | ------------ | -- | --- |
| 7  | 0.6 | 32 | 19 | 26           | 35           | 26 | 84  |
| 8  | 0.9 | 44 | 35 | Material failure | Material failure | 49 | 99  |
| 9  | 1.0 | 35 | 16 | 22           | Material failure | 21 | 57  |
| 10 | 0.4 | 10 | 12 | 19           | 25           | 16 | 29  |
| 11 | 0.9 | 9  | 14 | 21           | 48           | 20 | 36  |
| 12 | 1.1 | 33 | 13 | 19           | 20           | 20 | 67  |
| 13 | 1.5 | 34 | 16 | 24           | 27           | 23 | 72  |
| 14 | 0.8 | 32 | 13 | 22           | 23           | 18 | 69  |
| 15 | 0.8 | 35 | 19 | 25           | 29           | 22 | 75  |
| 16 | 0.8 | 44 | 38 | Material failure | Material failure | 50 | 96  |
| 17 | 0.8 | 39 | 31 | 49           | Material failure | 42 | 67  |
| 18 | 0.9 | 38 | 24 | 35           | 39           | 31 | 59  |
| 19 | 1.1 | 34 | 22 | 31           | 44           | 34 | 68  |
| 20 | 0.8 | 39 | 32 | 40           | Material failure | 45 | 97  |
| 21 | 0.8 | 44 | 45 | Material failure | Material failure | 52 | 97  |
| 22 | 0.9 | 46 | 42 | Material failure | Material failure | 59 | 96  |
| 23 | 0.8 | 48 | 44 | Material failure | Material failure | 57 | 100 |
| 24 | 0.8 | 47 | 41 | Material failure | Material failure | 62 | 102 |
| Comparative Examples | | | | | | | |
| 1  | 1.1 | 8  | 9  | 10 | 21 | 12 | 8   |
| 2  | 1.8 | 32 | 6  | 18 | 18 | 15 | 12  |
| 3  | 0.6 | 16 | 11 | 20 | 19 | 13 | 6   |
| 4  | 1.2 | 28 | 10 | 8  | 18 | 8  | 20  |
| 5  | 1.7 | 34 | 8  | 20 | 20 | 15 | 30  |
| 6  | 0.9 | 27 | 8  | 13 | 9  | 12 | 28  |
| 7  | 0.9 | 13 | 5  | 6  | 6  | 8  | 0   |

*1: parts by mass in relation to 100 parts by mass of (A)
*2: parts by mass in relation to 100 parts by mass of total amount of (A) and (B)
*3: parts by mass in relation to 100 parts by mass of total amount of (A), (B) and (C)

As can be seen from Table 2, the aqueous dispersions of the present invention obtained in Examples 1 to 24 were found to be excellent in the adhesiveness to rubber sheets, molded articles and foams of polyolefin resin, polyurethane resin sheets, leather and hemp woven fabric. The adhesiveness was found to have an excellent adhesive strength retention rate with respect to cold bending. Moreover, the aqueous dispersion was excellent in the mixing stability with an organic solvent, and the coating film surface obtained from the aqueous dispersion was free from stickiness or tackiness, and accordingly excellent in slippage.

From a comparison of Examples 3, 16 and 17 with Examples 14 and 15, the use of an ethylene-acrylic acid ester-maleic anhydride copolymer as the acid-modified polyolefin resin (A) was found to be preferable to the use of an ethylene-methacrylic acid copolymer from the viewpoint of the adhesiveness.

In Examples 21 to 24, the addition of another resin or a cross-linking agent as an additive was verified to improve the performance.

As described above, the excellent strength retention with respect to the cold bending was verified in Examples. Although the detailed mechanism for this phenomenon is not clear, the intrinsic viscoelastic properties of the polyolefin resin (A), the rubber component (B) and the tackifier component (C) constituting the adhesive layer interfere with each other when the temperature is low, and the adhesive layer obtained from the mixture composed of these undergoes the development of such a performance as a reaction to the bending.

On the contrary, the aqueous dispersion of Comparative Example 1 did not include the rubber component (B), and hence was poor in adhesiveness. This may be ascribable to the poor adhesiveness to the interface with the rubber substrate.

The aqueous dispersion of Comparative Example 2 did not include the acid-modified polyolefin resin (A), and hence was poor in adhesiveness. This may be ascribable to the poor adhesiveness to the interface with the polyolefin resin substrate. The obtained coating film was sticky even at room temperature, and was poor in slippage. Moreover, dilution of the aqueous dispersion with an alcohol caused aggregation.

The aqueous dispersions of Comparative Examples 3, 4 and 5 did not include the rubber component (B) or the tackifier component (C) in an appropriate amount, and hence were found to be poor in adhesiveness.

The aqueous dispersions of Comparative Examples 6 and 7 each used a polyolefin resin (A) having a content of the unsaturated carboxylic acid component deviating from the content specified in the present invention, and were verified to be thereby poor in various performances. Additionally, it has been verified that when the melt flow rate value of the polyolefin resin (A) deviates from the preferable range of the present invention, the adhesiveness is poorer.

The invention claimed is:

1. An aqueous dispersion comprising an acid-modified polyolefin resin (A) having a content of an unsaturated carboxylic acid component of 0.1 to 10% by mass, a rubber component (B), a tackifier component (C) and an aqueous medium, wherein
the rubber component (B) is a chloroprene rubber; in relation to 100 parts by mass of the acid-modified polyolefin resin (A), the content of the rubber component (B) is 5 to 1900 parts by mass; and in relation to 100 parts by mass of a total amount of the acid-modified polyolefin resin (A) and the rubber component (B), the content of the tackifier component (C) is 5 to 300 parts by mass.

2. The aqueous dispersion according to claim 1, wherein the acid-modified polyolefin resin (A) is an ethylene-(meth)acrylic acid ester-(anhydrous) maleic acid copolymer.

3. The aqueous dispersion according to claim 1, wherein a melt flow rate value (according to ISO1133, at 190° C., under a load of 21.2 N) of the acid-modified polyolefin resin (A) is 1 to 300 g/10 min.

4. The aqueous dispersion according to claim 1, wherein the tackifier component (C) is a terpene-based resin.

5. The aqueous dispersion according to claim 1, wherein a number average particle size of dispersed particles in the aqueous dispersion is 0.5 μm or less.

6. The aqueous dispersion according to claim 1, wherein a static friction coefficient (according to ISO8295) of a surface of an obtained coating film in an atmosphere at 23±2° C. is 1.5 or less.

7. A laminate comprising a coating film obtained from the aqueous dispersion according to claim 1, wherein the coating film is laminated at least on a part of a substrate.

8. A laminate wherein a substrate comprising a polyolefin resin and a substrate comprising a rubber are allowed to adhere to each other through the intermediary of a coating film obtained from the aqueous dispersion according to claim 1.

9. An adhesive for footwear, wherein the adhesive for footwear is an adhesive comprising the aqueous dispersion according to claim 1, and a constitutional member of footwear is an adherend of the adhesive.

10. The adhesive for footwear according to claim 9, wherein the constitutional member of footwear comprises one or more selected from the group consisting of a leather material, a woven fabric, a knitted fabric, a polyvinyl chloride resin, a polyurethane resin, a polyolefin resin and a rubber.

11. A set of footwear obtained by using the adhesive for footwear according to claim 9.

12. An aqueous dispersion comprising an acid-modified polyolefin resin (A) having a content of an unsaturated carboxylic acid component of 0.1 to 10% by mass, a rubber component (B), a tackifier component (C) and an aqueous medium, wherein
in relation to 100 parts by mass of the acid-modified polyolefin resin (A), the content of the rubber component (B) is 5 to 1900 parts by mass; in relation to 100 parts by mass of a total amount of the acid-modified polyolefin resin (A) and the rubber component (B), the content of the tackifier component (C) is 5 to 300 parts by mass; and a number average particle size of dispersed particles in the aqueous dispersion is 0.5 μm or less.

13. The aqueous dispersion according to claim 12, wherein the acid-modified polyolefin resin (A) is an ethylene-(meth) acrylic acid ester-(anhydrous) maleic acid copolymer.

14. The aqueous dispersion according to claim 12, wherein the tackifier component (C) is a terpene-based resin.

15. A laminate comprising a coating film obtained from the aqueous dispersion according to claim 12, wherein the coating film is laminated at least on a part of a substrate.

16. A laminate wherein a substrate comprising a polyolefin resin and a substrate comprising a rubber are allowed to adhere to each other through the intermediary of a coating film obtained from the aqueous dispersion according to claim 12.

17. An adhesive for footwear, wherein the adhesive for footwear is an adhesive comprising the aqueous dispersion according to claim 12, and a constitutional member of footwear is an adherend of the adhesive.

18. The adhesive for footwear according to claim 17, wherein the constitutional member of footwear comprises one or more selected from the group consisting of a leather material, a woven fabric, a knitted fabric, a polyvinyl chloride resin, a polyurethane resin, a polyolefin resin and a rubber.

19. A set of footwear obtained by using the adhesive for footwear according to claim 17.

* * * * *